July 27, 1937.  S. HANNAH  2,087,970
NAVIGATIONAL INSTRUMENT
Filed March 5, 1936
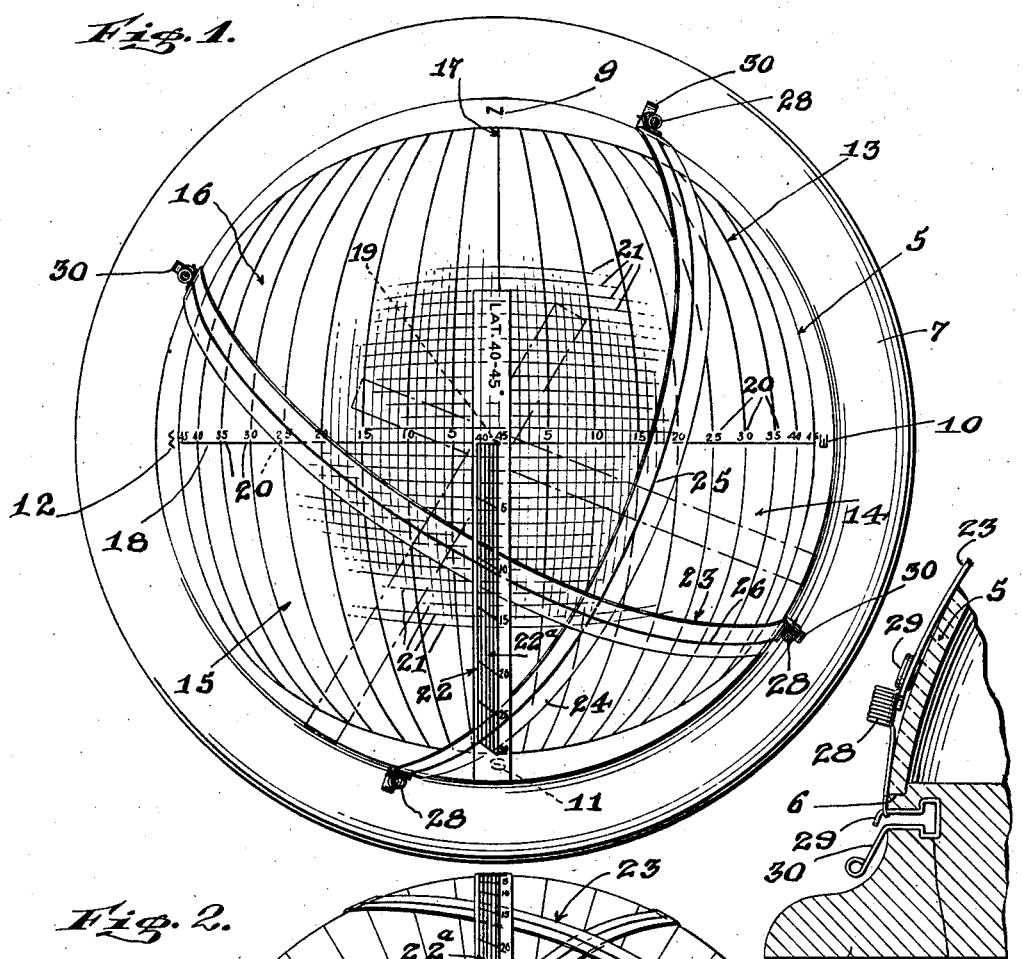
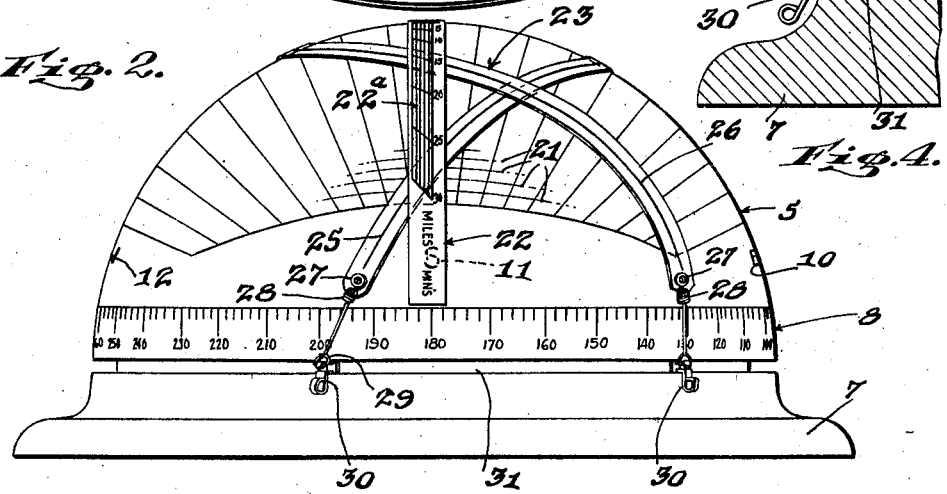
INVENTOR
Siegfried Hannah
BY
Seymour & Bright
ATTORNEYS Patented July 27, 1937

2,087,970

UNITED STATES PATENT OFFICE 2,087,970

NAVIGATIONAL INSTRUMENT

Siegfried Hannah, New York, N. Y.

Application March 5, 1936, Serial No. 67,351

20 Claims. (Cl. 33—1)

This invention relates to an improved apparatus for nautical charting and navigating and the primary purpose of the invention is to provide a navigational instrument of compact form which will greatly simplify the structures and procedures now employed for nautical charting and navigation purposes.

In order that the use of my apparatus may be readily understood by those familiar with navigation, I may state that present-day navigators favor the "line of position", "Sumner line", or "circle of equal altitude" solution of the astronomical triangle for the determination of latitude and longitude almost to the exclusion of other methods.

An explanation of the "line of position" is simple. If we took a sextant or other suitable device and measured the altitude of a heavenly body, (assumed to be a stationary body for purposes of explanation) it is obvious that if we should move an appreciable distance towards or away from the observed body, the altitude after having moved towards the body would be greater than that of the original observation. Conversely, if we moved away from the body, the altitude would be less than that of the original observation. In order to maintain the altitude of the first observation we would have to move to the right or left at right angles to the bearing of the observed body. This right or left movement if extended far enough would describe a circle on the earth's surface since for navigational purposes the earth is considered a sphere. This "circle of equal altitude", which for short distances is considered a straight line, is the "line of position". The intersection of two such circles or lines would fix our position at the point of intersection. In this connection the authority Lecky states: "It is true that circles intersect each other at two points but these are generally far apart—perhaps in opposite hemispheres—and surely the observer knows his whereabouts within a handfull of degrees."

Ordinarily the ship runs an appreciable distance from a determined position before sights are again taken. This new position is roughly determined by noting the course and speed of the ship during the interval. This position is known as the "dead reckoning position" and serves as the basis for computing the altitude of the observed body. If our actual observed altitude differs from the computed altitude the difference expressed in minutes of arc corresponding with miles, tells us how far our true position is towards or away from the body using the "dead reckoning position" as a starting point. If two bodies are observed simultaneously we get what is known as a "fix". This "fix" is then plotted on a Mercator chart and the latitude and longitude scaled from the chart. The latitude and longitude of this position may be computed with the aid of tables but the process is so laborious and surrounded with special rules it is seldom employed.

The necessity of plotting "lines of position" is the chief draw-back of this method. Plotting is a time-consuming and awkward job requiring adequate equipment and a suitable place to work. There are many environments such as the navigator's cockpit of a plane, or the limited facilities of small craft, or even the cramped quarters of an officer's stateroom, where it is impossible to find room to stretch out the necessary chart not to mention the difficulty of manipulating parallel rules, pencil and dividers. It is this step that my instrument was designed to facilitate. One exemplary embodiment of such instrument is described in detail in the following description, illustrated in the accompanying drawing and more particularly pointed out in the appended claims.

In the drawing:

Fig. 1 is a top plan view of the instrument.

Fig. 2 is a side elevation of the same.

Fig. 3 is a plan view of one of the twelve scales used with the instrument.

Fig. 4 is a vertical sectional view of a portion of the instrument and illustrating the means for adjustably connecting the straps to the base of the instrument.

Referring to the drawing, 5 designates a semi-spherical dome or supporting member corresponding to a hemisphere of a globe. It may be constructed of any suitable material, such as wood, metal, glass, hard rubber, thermoplastic material or the like, and it may be opaque, translucent or transparent, so that it may be illuminated internally or externally. I have shown the same as formed of a hollow glass dome having its edge seated in an annular rabbet 6 on a disc-shaped base 7.

The hemisphere has inscribed upon it the development of a small area Mercator chart 1 degree in extent with some excess if desirable, and the inscriptions are preferably arranged as follows: The equator of the hemisphere, as shown in Fig. 2, is graduated at 8 in single degrees clockwise from 0° to 360°. The 0-360 degree point will be designated N (north), as shown at 9; 90 degree E (east), as at 10; 180 degree S (south) as at 11; and 270 degree W (west) as at 12. The hemisphere is divided into four equal quadrants 13, 14, 15 and 16 by arcs of great circles, 17 connecting the 0° point with the 180° point, and another 18 connecting the 90° point with the 270° point. Obviously these arcs intersect at the pole 19 of the instrument. The E—W circle has 45 graduations 20 of equal length on either side of the instrument's pole. Only some of these graduations are shown to facilitate illustration and it will be understood that those at the extremities will be in excess. Of course, these graduations will be to a suitable scale. The N—S circle has corresponding guide lines or arcs of great circles 21. The scale of the chart used will be governed by that of the longitude (E—W) graduations. Arcs of great circles (meridians) are inscribed through each of the longitude graduations 20 intersecting necessarily at the 0°–360° point, and also at the 180° point. Similar great circle arcs (parallels) are inscribed through the latitude graduations 21 intersecting on the equator at the 90° and 270° points respectively. These latter circles only serve as guide lines.

With such a hemisphere, I employ a number of scale members 22; twelve for example, only one of which is illustrated. Each scale is preferably constructed of flexible transparent material, such as celluloid, and inscribed on each of these may be five scales 22a spaced according to the Mercator projection principle, each one representing a predetermined distance of miles or minutes of latitude (thirty for example) with intermediate graduations. Thus with twelve scales I have suitable distance scales for each degree of latitude from 0° to 60° north or south. The 0° point of the scale selected will be placed in coincidence with the pole 19 of the hemisphere as shown in Fig. 1, and the scale will be held in alignment with the 0°–180° circle. The placement of this scale completes the Mercator chart for the desired latitude.

The actual "lines of position" are represented by lengthwise flexible transparent line strips 23 and 24 of celluloid or other suitable material, each of which has inscribed thereon a lengthwise center line 25, 26. The ends of each of these strips are always arranged 180° apart relatively to the hemisphere and they are adjustably connected to the base of the hemisphere to allow for movement about the equator of the instrument, and are also pivotally connected to the equator so as to allow either strip to be shifted on the hemisphere about an imaginary axis passing through the points of pivoting. Obviously such an arrangement may be made in numerous ways and for the purpose of the present disclosure I have shown each end of either band rigidly connected at 29 to one end of a tension element or coil spring 28, the other end of the spring being pivotally connected at 29 to a manually operated spring clip 30 that slides in an annular groove 31 that is arranged in the base 7 and corresponds with the equator of the instrument. The small springs 28 produce a slight tension which holds the strips 23, 24 in place on the surface of the hemisphere, and the pivots 29 allow the strips to be moved back and forth over the surface of the hemisphere as desired.

In using the instrument, the clips 30, which hold the line strips, will move freely in the groove 31 under the hand of the operator so that the lines may be caused to move in azimuth about the pole of the instrument.

In using the instrument, the navigator having taken his sights and completed the customary mathematical computations, will have the following data for one or more sights: Dead reckoning latitude and longitude of "assumed position," true bearing of observed body or bodies, altitude difference in each case. Two of the clips 30 at the ends of one of the line strips 23, 24, will then be set in the equatorial groove 31 diametrically opposite each other and their position will be determined by adding or subtracting 90° from the true bearing of the observed body. Then the line strip connected to these two clips will be positioned on the face of the hemisphere so that the center line of the strip will pass through the pole 19 of the instrument. A scale 22 will then be selected which agrees with the dead reckoning latitude and will be held in place on the surface of the hemisphere approximately perpendicular to the "line", and the 0° of the scale will be held in coincidence with the instrument's pole. Now while the scale 22 is held in this position, the line strip will be slid away from the polar point a distance equal to the altitude difference towards or away from the observed body according to the customary rule. This having been done, the "line" is in position on the chart and the same process is repeated for other lines. To read off the point of intersection of two or more lines, the scale is moved back in coincidence with the local meridian, and the curves on the hemisphere are followed to left or right as the case may be until the curves intersect the scale. The operator reads off the number of minutes north or south of the polar point and adds or subtracts the result to or from the dead reckoning latitude. To arrive at the longitude, one follows the meridianal curves until they intersect the 90°–270° parallel of the instrument, reads off the number of minutes east or west of the polar point and adds or subtracts the result to or from the dead reckoning longitude.

Other uses for the instrument similar to such work usually carried on with the aid of the Mercator chart are obvious, for example, running dead reckoning, position determination by bearings, etc.

From the foregoing, it is believed that the invention may be readily understood by those skilled in the art.

Many modifications of the invention will be apparent to those familiar with navigation without departing from the invention or from the scope of the claims, and since the foregoing disclosures have been given by way of example for clearness and understanding, no unnecessary limitations should be understood, and the appended claims should be construed as broadly as the state of the art permits.

What I claim and desire to secure by Letters Patent is:

1. In combination, a supporting member having a substantially hemispherical surface, a development of a Mercator chart arranged on said surface and divided by arcs of great circles extending from a zero point at the base of the hemisphere to a diametrically opposite point at the base of the hemisphere, and other arcs of great circles crossing said first mentioned arcs and extending from a 90° point at said base to a diametrically opposite point of the base, and a line strip extending along said substantially hemispherical surface and having its ends movably connected to the base of the hemisphere at diametrically opposite points.

2. In an instrument of the character described, a hemispherical surface provided at its edge portion with an equatorial scale calibrated in degrees from 0 to 360, spaced lines corresponding to arcs of great circles inscribed on said surface and extending from the 0° point on said scale to the 180° point of the scale, and other spaced lines corresponding to arcs of great circles inscribed on the surface crossing the first mentioned lines and extending from the 90° point on the scale to the 270° point, and a line strip extending along said hemispherical surface and having its ends pivotally mounted and movable along said equatorial scale.

3. An apparatus for nautical charting and navigating comprising a rigid hemisphere having angular divisions indicated on its surface adjacent to its base and corresponding to the divisions of a mariner's compass, said hemisphere being provided with series of lines, the lines of one series extending from north to south, and the lines of the second series extending from east to west, and a line strip extending along the hemispherical surface of the hemisphere and having its ends movably connected to the base of the hemisphere and arranged diametrically opposite one another.

4. An apparatus for nautical charting and navigating comprising a rigid hemisphere having angular divisions indicated on its surface adjacent to its base and corresponding to the divisions of a mariner's compass, said hemisphere being provided with series of lines, the lines of one series extending from north to south, and the lines of the second series extending from east to west, all of the north and south lines intersecting at an imaginary axis extending diametrically through the base portion of the hemisphere from north to south, and all of the east and west lines intersecting at an imaginary axis extending diametrically through the base portion of the hemisphere from east to west, and a pair of line strips arranged at angles to one another and extending along the hemispherical surface of the hemisphere, each strip having its ends positioned at the base portion of the hemisphere and movable along the base portion of the hemisphere.

5. A navigational instrument comprising a rigid hemisphere having angular divisions corresponding to the divisions of a mariner's compass, a line strip cooperating with the hemisphere and having its ends connected to the base of the hemisphere at diametrically opposite points.

6. A navigational instrument comprising a rigid hemisphere having angular divisions corresponding to the divisions of a mariner's compass, a line strip cooperating with the hemisphere and having its ends connected to the base of the hemisphere at diametrically opposite points, the ends of the strip being shiftable in an annular path at the base of the hemisphere.

7. A navigational instrument comprising a rigid hemisphere having angular divisions corresponding to the divisions of a mariner's compass, a line strip cooperating with the hemisphere and having its ends connected to the base of the hemisphere at diametrically opposite points, the ends of the strip being pivotally mounted to permit the body of the strip to be shifted relatively to the surface of the hemisphere while the equatorial pivots remain stationary.

8. A navigational instrument comprising a rigid hemisphere provided at its base with an equatorial guide way, said hemisphere having inscribed on its surface adjacent to said guide way, angular divisions corresponding to the divisions of a mariner's compass, guide elements cooperating with said guide way and shiftable along the guide way, an arc-shaped line strip cooperating with the surface of the hemisphere, and means connecting the ends of the strip to a pair of said guide elements at diametrically opposite points at the base of the hemisphere.

9. A navigational instrument comprising a rigid hemisphere provided at its base with an equatorial guide way, said hemisphere having inscribed on its surface adjacent to said guide way, angular divisions corresponding to the divisions of a mariner's compass, guide elements cooperating with said guide way and shiftable along the guide way, an arc-shaped line strip cooperating with the surface of the hemisphere, and means of connecting the ends of the strip to a pair of said guide elements at diametrically opposite points at the base of the hemisphere. the last mentioned means including pivotal connections to allow the body of the strip to be shifted relatively to the surface of the hemisphere while the equatorial pivots remain stationary.

10. A navigational instrument comprising a rigid hemisphere provided at its base with an equatorial guide way, said hemisphere having inscribed on its surface adjacent to said guide way, angular divisions corresponding to the divisions of a mariner's compass, guide elements cooperating with said guide way and shiftable along the guide way, an arc-shaped line strip cooperating with the surface of the hemisphere, and means connecting the ends of the strip to a pair of said guide elements at diametrically opposite points at the base of the hemisphere, the last mentioned means including a tension element for holding the line strip in snug engagement with the surface of the hemisphere.

11. A navigational instrument comprising a rigid hemisphere provided at its base with an equatorial guide way, said hemisphere having inscribed on its surface adjacent to said guide way, angular divisions corresponding to the divisions of a mariner's compass, guide elements cooperating with said guide way and shiftable along the guide way, an arc-shaped line strip cooperating with the surface of the hemisphere, and means connecting the ends of the strip to a pair of said guide elements at diametrically opposite points at the base of the hemisphere, said strip being provided with an indicating line extending lengthwise of the strip.

12. A navigational instrument comprising a rigid hemisphere provided at its base with an equatorial guide way, said hemisphere having inscribed on its surface adjacent to said guide way, angular divisions corresponding to the divisions of a mariner's compass, guide elements cooperating with said guide way and shiftable along the guide way, an arc-shaped line strip cooperating with the surface of the hemisphere, and means connecting the ends of the strip to a pair of said guide elements at diametrically opposite points at the base of the hemisphere, said strip being flexible lengthwise thereof, 13. A navigational instrument comprising a rigid hemisphere provided at its base with an equatorial guide way, said hemisphere having inscribed on its surface adjacent to said guide way, angular divisions corresponding to the divisions of a mariner's compass, guide elements cooperating with said guide way and shiftable along the guide way, an arc-shaped line strip cooperating with the surface of the hemisphere, means connecting the ends of the strip to a pair of said guide elements at diametrically opposite points at the base of the hemisphere, and a scale member cooperating with the hemisphere and extending from the pole of the hemisphere toward the base of the latter, said scale member having a scale spaced according to the Mercator projection principle and representing a distance of a predetermined number of miles or minutes of latitude with intermediate graduations.

14. A navigational instrument comprising a rigid hemisphere having visible angular divisions corresponding to the divisions of a mariner's compass and also having guide lines corresponding to arcs of great circles, a guide way at the base of the hemisphere corresponding to the equator of the instrument, guide elements cooperating with the guide way and positioned diametrically opposite one another, and a line strip cooperating with the hemisphere and having its ends connected to said guide elements.

15. A navigational instrument comprising a rigid hemisphere having visible angular divisions corresponding to the divisions of a mariner's compass and also having guide lines corresponding to arcs of great circles, a guide way at the base of the hemisphere corresponding to the equator of the instrument, guide elements cooperating with the guide way and positioned diametrically opposite one another, and a line strip cooperating with the hemisphere and having its ends pivotally connected to said guide elements.

16. A navigational instrument comprising a rigid hemisphere having visible angular divisions corresponding to the divisions of a mariner's compass and also having guide lines corresponding to arcs of great circles, a guide way at the base of the hemisphere corresponding to the equator, guide elements cooperating with the guide way and positioned diametrically opposite one another, a line strip cooperating with the hemisphere and having its ends connected to said guide elements, and a scale member cooperating with the hemisphere and extending from the pole of the latter toward the equatorial part of the hemisphere, said scale member having a scale spaced according to the Mercator projection principle and representing a distance of a predetermined number of miles or minutes of latitude with intermediate graduations.

17. A navigational instrument comprising a rigid hemisphere having angular divisions corresponding to the divisions of a mariner's compass and also inscribed with intersecting lines corresponding to arcs of great circles, an annular guide way arranged at the equatorial portion of the hemisphere, guide elements shiftable along said guide way, a plurality of line strips cooperating with the hemisphere and each having its ends connected to a pair of said guide elements at diametrically opposite points at the peripheral portion of the hemisphere, and a scale member cooperating with the hemisphere with the line strips and extending from the pole of the hemisphere toward the equatorial portion of the same, said scale member being provided with a scale spaced according to the Mercator projection principle and representing a distance of a predetermined number of miles or minutes of latitude with intermediate graduations.

18. A navigational instrument comprising a rigid hemisphere having angular divisions corresponding to the divisions of a mariner's compass and also inscribed with intersecting lines corresponding to arcs of great circles, an annular guide way arranged at the equatorial portion of the hemisphere, guide elements shiftable along said guide way, a plurality of line strips cooperating with the hemisphere and each having its ends pivotally connected to a pair of said guide ways at diametrically opposite points at the peripheral portion of the hemisphere, and a scale member cooperating with the hemisphere and with the line strips and extending from the pole of the hemisphere toward the equatorial portion of the same, said scale member being provided with a scale spaced according to the Mercator projection principle and representing a distance of predetermined number of miles or minutes of latitude with intermediate graduations.

19. A navigational instrument comprising a rigid hemisphere having angular divisions corresponding to the divisions of a mariner's compass and also inscribed with intersecting lines corresponding to arcs of great circles, an annular guide way arranged at the equatorial portion of the hemisphere, guide elements shiftable along said guide way, a plurality of line strips cooperating with the hemisphere and each having its ends pivotally connected to a pair of said guide ways at diametrically opposite points at the peripheral portion of the hemisphere, and a scale member cooperating with the hemisphere and with the line strips and extending from the pole of the hemisphere toward the equatorial portion of the same, said scale member being provided with a scale spaced according to the Mercator projection principle and representing graduations, said hemisphere being of hollow construction and formed of light-transmitting material.

20. A navigational instrument comprising a rigid hemisphere having a development of a Mercator chart substantiallly covering said hemisphere and a line strip extending along said surface and having its ends pivotally connected to the base of the hemisphere at diametrically opposite points, the ends of the line strip being shiftable along the base of the hemisphere.

SIEGFRIED HANNAH.